S. O. HOFF.
TIRE.
APPLICATION FILED APR. 20, 1917.
1,253,598.
Patented Jan. 15, 1918.
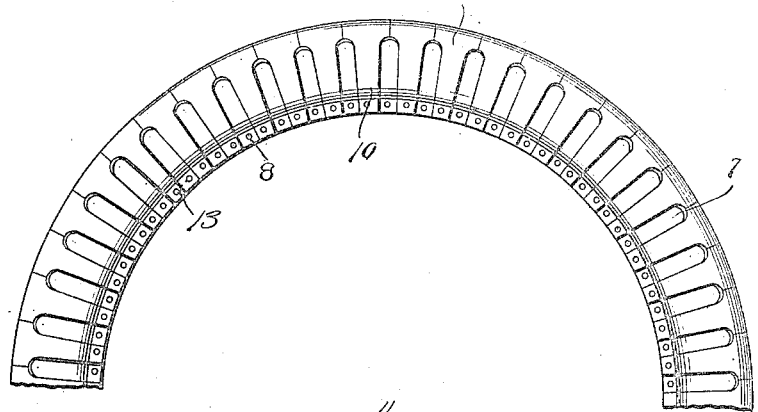
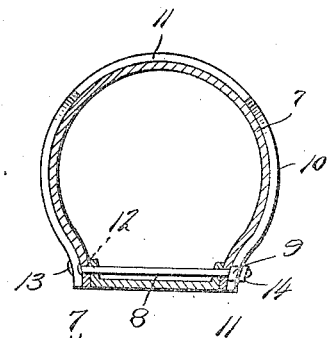
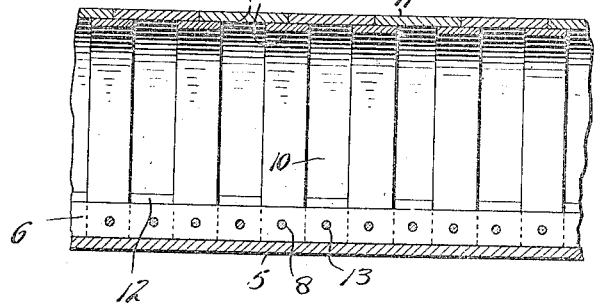
Inventor
Selmer O. Hoff.
Witness
By
Attorney

UNITED STATES PATENT OFFICE.

SELMER O. HOFF, OF TRAIL, MINNESOTA.

TIRE.

1,253,598.

Specification of Letters Patent.   Patented Jan. 15, 1918.

Application filed April 20, 1917.   Serial No. 163,482.

*To all whom it may concern:*

Be it known that I, SELMER O. HOFF, a citizen of the United States, residing at Trail, in the county of Polk and State of Minnesota, have invented certain new and useful Improvements in Tires, of which the following is a specification.

My invention relates to vehicle tires and more particularly to an automobile tire, the principal object being to provide a tire which will possess the resiliency that pneumatic tires that are now in use have and yet to obviate the danger of punctures and other tire trouble to which these pneumatic tires are subjected.

A further object of the invention is to provide a tire for automobiles and other vehicles which consists primarily of a plurality of bowed leaf springs which will render the tire strong and durable and possess a maximum amount of resiliency.

Still another object is to provide a resilient tire which is easily assembled and disassembled and the parts of which may be replaced should the original ones become worn or broken.

It is another object to provide a resilient or spring tire possessing the above outlined features and others to be hereinafter discussed and which may be readily and easily attached and detached to and from the wheel.

An additional object is to provide a spring tire which consists of few easily arranged elements which are not likely to become inoperative and which may be manufactured and placed on the market at a minimum cost.

The above general objects together with others will be fully set forth in the following description, illustrated in the accompanying drawings and explicitly defined in the appended claims.

On the drawings:

Figure 1 is a side elevation of a tire constructed in accordance with my invention, part of the tire being broken away.

Fig. 2 is a transverse sectional view through my improved tire, and

Fig. 3 is a longitudinal sectional view of the same.

Referring in detail to the drawing in which like characters of reference designate like parts in all the views the numeral 5 designates a ring which is formed of the usual metal and is bent to provide spaced parallel flanges 6 which extend clear around the peripheral edge of the ring.

The numeral 7 designates the bowed springs of my improved tire which are formed of any suitable grade of metal and which possess the desired strength and resiliency. These springs 7 are of a uniform width and thickness and are secured to the flanges 6 of the ring at their extremities by means of transversely extending bolts 8 which extend therethrough and through these flanges. Removable nuts 9 are threaded on these bolts 8 and bear against the adjacent extremities of the springs. These springs 7 are spaced apart for a relatively great distance as clearly indicated in Fig. 3. Preferably the space between these springs is approximately one inch.

Overlying the springs 7 are tread members 10 which are formed with substantially rectangular enlargements 11 at their centers and are of uniform width beyond these enlargements. These enlargements abut and are disposed at the crest of the tire as clearly indicated in Fig. 1. The extremities of the tread members 10 extend toward the flanges 6 and are secured thereto in a manner which will be set forth below.

Disposed between the bowed springs 7 at their extremities and underlying the extremities of the tread members 10 are spacing blocks 12. Extending transversely through the extremities of these tread members 10 and the spacing blocks 12 are bolts 13 that extend through the flanges 6 of the ring 5 and have nuts 14 threaded thereon. These tread members are formed of any desired material such as canvas, leather or in fact any other material having the desired thickness and flexibility.

It will be seen that the tread members being in contact with one another will provide the tire with a smooth continuous tread. It will be manifest that the tire is to be used in conjunction with any conventional wheel and retained thereon by the usual fastening means that are used in connection with conventional demountable rims.

From the above disclosure it will be seen that I have provided a tire which does not necessitate inflating and which possesses the resiliency that pneumatic tires possess and which is very durable.

This disclosure is merely illustrative and it is to be understood that the inventive idea can be carried out in constructions other than the one herein specified and illustrated and that I will be justified in making such modifications which may be embodied in the scope of the appended claims.

What is claimed is:

1. A spring tire comprising a ring having annular flanges extending around its peripheral edges, bowed leaf springs secured to the flanges and arranged in spaced relation, tread members overlying the spaces between the springs, enlargements formed upon the tread members and abutting each other, spacing blocks arranged between the extremities of the springs, and means securing the tread members and spacing blocks to the flanges of the ring.

2. A tire including a ring, annular flanges extending outwardly from opposite sides of said ring, a plurality of bowed supporting springs arranged in spaced relation around said ring and having their opposite ends engaged with said flanges, a plurality of fastening bolts passing through said flanges and through the ends of said springs, a plurality of tread members supported upon said supporting springs and arranged to close the spaces therebetween, and a plurality of fastening bolts passing through said flanges and fastening the ends of said tread members thereto.

In testimony whereof I affix my signature in presence of two witnesses.

SELMER O. HOFF.

Witnesses:
 ADOLPH A. DAHL,
 O. C. HOFF.

Copies of this patent may be obtained for five cents each, by addressing the "Commissioner of Patents, Washington, D. C."